(12) United States Patent
Wysocki

(10) Patent No.: US 12,491,135 B2
(45) Date of Patent: Dec. 9, 2025

(54) HERBAL DECARBOXYLATION AND INFUSION SYSTEM

(71) Applicant: Dennis Wysocki, Middletown, DE (US)

(72) Inventor: Dennis Wysocki, Middletown, DE (US)

( * ) Notice: Subject to any disclaimer, the term of this patent is extended or adjusted under 35 U.S.C. 154(b) by 1099 days.

(21) Appl. No.: 17/369,083

(22) Filed: Jul. 7, 2021

(65) Prior Publication Data

US 2021/0330555 A1    Oct. 28, 2021

Related U.S. Application Data

(63) Continuation-in-part of application No. 16/734,910, filed on Jan. 6, 2020, now Pat. No. 11,096,973.

(51) Int. Cl.
| | | |
|---|---|---|
| *A23L 33/105* | (2016.01) | |
| *A23D 9/04* | (2006.01) | |
| *A61J 3/00* | (2006.01) | |
| *A61L 9/014* | (2006.01) | |
| *A61M 15/00* | (2006.01) | |
| *B01D 11/02* | (2006.01) | |

(Continued)

(52) U.S. Cl.
CPC ............ *A61J 3/00* (2013.01); *A61M 15/0001* (2014.02); *A61M 15/0085* (2013.01); *B01D 11/0207* (2013.01); *B01D 11/0257* (2013.01); *B01D 11/0288* (2013.01); *A61K 36/185* (2013.01); *A61M 2202/0078* (2013.01); *A61M 2205/18* (2013.01); *A61M 2205/3368* (2013.01); *A61M 2205/3553* (2013.01); *A61M 2205/3606* (2013.01); *A61M 2205/3633* (2013.01); *A61M 2205/505* (2013.01); *A61M 2205/581* (2013.01); *A61M 2205/75* (2013.01)

(58) Field of Classification Search
CPC ...... A61J 3/00; B01D 11/028; B01D 11/0257; B01D 11/0288; B01D 46/0038; B01D 11/0207; A61M 15/0001; A61M 15/0085; A61M 2202/0078; A61M 2205/18; A61M 2205/3553; A61M 2205/3368; A61M 2205/75; A61M 2205/505; A61M 2205/3633; A61M 2205/3606; A61M 2205/581; A61K 36/185; C07B 37/06; A61L 9/014; A61L 9/16; A61L 2209/14; C11C 3/14; C11C 3/00; C11B 3/02; C11B 3/001; A23L 33/105; A23L 2/38; A23L 33/115; A23D 9/04; A23V 2002/00
USPC .................................................. 392/304, 386
See application file for complete search history.

(56) References Cited

U.S. PATENT DOCUMENTS 9,394,504 B1 *   7/2016   Shepherd .................. C11B 1/14
9,857,810 B2 *   1/2018   Smith, Jr. ............... F24D 5/005
(Continued)

*Primary Examiner* — Eric S Stapleton
(74) *Attorney, Agent, or Firm* — The Rapacke Law Group, P.A.; Andrew Rapacke

(57) ABSTRACT

A system for decarboxylating and infusing an organic material is disclosed, including a heated reservoir including a spout to fittingly engage with a complimentary portion of a housing. The decarboxylation and infusion apparatus is in operable communication with a touchscreen user interface whereon a user selects decarboxylation and infusion settings, the heated reservoir including a mixing element to agitate an organic material and solvent disposed therein, the spout to prevent counterrotation caused by the mixing element. A fan actively cools the heated reservoir, the fan in communication with a vent having a filter, the vent to expel and deodorize air emitted therefrom.

15 Claims, 9 Drawing Sheets

(51) Int. Cl.
*B01D 46/00* (2022.01)
*C07B 37/06* (2006.01)
*A61K 36/185* (2006.01)

(56) References Cited

U.S. PATENT DOCUMENTS

| | | | |
|---|---|---|---|
| 10,018,362 B1* | 7/2018 | Swanson | F24B 1/183 |
| 10,022,614 B1* | 7/2018 | Tran | G16H 50/20 |
| 10,325,596 B1* | 6/2019 | Tran | G10L 15/1822 |
| 10,500,525 B2* | 12/2019 | Hare | B01D 11/04 |
| 11,096,973 B2* | 8/2021 | Wysocki | B01D 11/0288 |
| 11,175,056 B1* | 11/2021 | Stevenson | F24F 11/74 |
| 11,738,059 B2* | 8/2023 | Guillory | A61K 36/185 |
| | | | 424/725 |
| 2003/0034401 A1* | 2/2003 | Burkett | A47J 39/006 |
| | | | 62/189 |
| 2003/0175392 A1* | 9/2003 | Garwood | B65D 77/2008 |
| | | | 426/392 |
| 2003/0185948 A1* | 10/2003 | Garwood | A23B 4/10 |
| | | | 426/392 |
| 2004/0081729 A1* | 4/2004 | Garwood | A23B 4/10 |
| | | | 426/235 |
| 2004/0265164 A1* | 12/2004 | Woo | B60H 3/0035 |
| | | | 422/4 |
| 2010/0115785 A1* | 5/2010 | Ben-Shmuel | H05B 6/72 |
| | | | 34/260 |
| 2014/0116870 A1* | 5/2014 | Kamen | E04H 3/02 |
| | | | 202/83 |
| 2015/0000535 A1* | 1/2015 | Yoshidome | F24C 15/327 |
| | | | 126/21 A |
| 2015/0114089 A1* | 4/2015 | Dudar | F02M 25/0809 |
| | | | 73/40 |
| 2015/0276237 A1* | 10/2015 | Daniels | G05D 23/1905 |
| | | | 237/2 A |
| 2015/0276238 A1* | 10/2015 | Matsuoka | H04L 12/2816 |
| | | | 700/278 |
| 2016/0122685 A1* | 5/2016 | Martinsen | B01D 11/0261 |
| | | | 202/168 |
| 2016/0216712 A1* | 7/2016 | Baumgartner | A61L 2/24 |
| 2016/0244702 A1* | 8/2016 | Redding | A23L 7/104 |
| 2017/0055761 A1* | 3/2017 | Roberts | A47J 31/0673 |
| 2017/0176096 A1* | 6/2017 | Lundberg | F25D 31/006 |
| 2018/0000255 A1* | 1/2018 | Youngblood | F28F 3/12 |
| 2018/0195731 A1* | 7/2018 | Swanson | F24C 7/004 |
| 2018/0199584 A1* | 7/2018 | Jaiswal | A23C 9/1223 |
| 2018/0236017 A1* | 8/2018 | Stoops | A61K 47/10 |
| 2019/0054394 A1* | 2/2019 | Hare | A61K 36/18 |
| 2019/0085279 A1* | 3/2019 | Leo | A23L 2/60 |
| 2019/0246591 A1* | 8/2019 | Leo | B01D 11/0257 |
| 2021/0330555 A1* | 10/2021 | Wysocki | A61J 3/00 |

* cited by examiner

HERBAL DECARBOXYLATION AND INFUSION SYSTEM

CROSS-REFERENCE TO RELATED APPLICATIONS

The present application claims priority to U.S. Non-Provisional patent application Ser. No. 16/734,910 filed on Jan. 6, 2020, entitled "HERBAL DECARBOXYLATION AND INFUSION SYSTEM" the entire disclosure of which is incorporated by reference herein.

TECHNICAL FIELD

The embodiments presented relate to systems for the automated decarboxylation of organic material and infusing the organic materials in a solvent.

BACKGROUND

The process of infusing solvents such as oils, fats, or alcohols with an organic material has been used to allow for or alter the delivery of organic material to a consumer. It is known that cannabis contains the medically useful molecules of cannabidiolic acid (CBDA), tetrahydrocannabinolic acid (THCA), and various other similar molecules. These molecules must be decarboxylated to yield Cannabidiol (CBD) and Tetrahydrocannabinol (THC), which are biologically active.

Following decarboxylation, the activated CBD and THC can be infused with a solvent for delivery to the consumer. Common solvents include butter, cooking oils, alcohols, glycerin, and other solvents having similar chemical properties. The infusion process binds the trichomes and plant-based oils into the solvent following a period of time and the introduction of heat and/or pressure.

The process of decarboxylation of cannabis has historically been performed using essential cookware and kitchen appliances. While some devices have been created to aid in decarboxylation or infusion, the currently available options are messy, odiferous, inflexible, inaccurate, and require multiple pieces of equipment for proper execution.

Many devices in the current arts emit odors produced throughout the decarboxylation and infusion processes. Further, the systems do not have an active cooling element, thus requiring a longer cooling stage during the process. The excess heat may degrade the final product and produce unwanted byproducts.

SUMMARY OF THE INVENTION

A system for decarboxylating and infusing an organic material is disclosed, including a heated reservoir including a spout to fittingly engage with a complimentary portion of a housing. The decarboxylation and infusion apparatus is in operable communication with a touchscreen user interface whereon a user selects decarboxylation and infusion settings, the heated reservoir including a mixing element to agitate an organic material and solvent disposed therein, the spout to prevent counterrotation caused by the mixing element. A fan actively cools the heated reservoir, the fan in communication with a vent having a filter, the vent to expel and deodorize air emitted therefrom.

In one aspect, the user interface is provided on a smart device in wireless communication with the decarboxylation and infusion apparatus.

In one aspect, the user interface is provided on a top portion of the decarboxylation and infusion apparatus, and wherein the user interface is a touchscreen.

In one aspect, the decarboxylation and infusion apparatus include a heated reservoir including an insulated layer.

In one aspect, the insulated layer prevents direct heat from being applied to the organic material.

In one aspect, the user interface includes a speaker to permit audio notification to be transmitted.

In one aspect, the decarboxylation and infusion apparatus is in operable communication with a computing device operating an application program, the application program operation the user interface to operate the decarboxylation and infusion apparatus.

The apparatus facilitates the activation of molecules via decarboxylation to produce a biologically active infused solvent. The infused solvent can be used as a foodstuff, additive, topical, or other delivery mechanism depending on the molecular configuration, which is then infused into the solvent.

Many decarboxylation and infusion apparatuses in the current arts emit odors from the mixing chamber into the surrounding environment. The embodiments herein provide a fan and vent system which actively eliminates and/or masks odors by transporting air through a filter.

In one aspect, a fan is provided to actively reduce the heat produced during the decarboxylation and infusion processes.

The decarboxylation and infusion apparatus described herein provides a means for a semi-automated system for performing the chemical processes of decarboxylating an organic material and infusing the decarboxylated organic material into a solvent for various applications, including consumption by a human. The apparatus may be provided as a single contained unit within a housing to prevent contamination, or undue transfer of the raw or processes materials.

In another aspect, the infusion setting is comprised of a time setting and a temperature setting allowing the user to control the type of infusion and potency of the final infused solvent product.

In one aspect, the solvent is comprised of at least one of the following: oil, butter, alcohol, or glycerin.

In another aspect, a user performs the steps of disposing an amount of the organic materials into the reservoir of the decarboxylation and infusion apparatus. The reservoir is then sealed, and a decarboxylation option is selected via the user interface. The decarboxylation is started, and once complete, the reservoir is opened, and the solvent is disposed of therein. The reservoir is sealed once more, and the organic material is infused with the solvent following the selection of a time and temperature option. Following the infusion protocol, the organic material is filtered to isolate the infused solvent.

In one aspect, the infused solvent is provided as a foodstuff, a beverage, a tonic, an elixir, a topical, a tincture, a liquid, a gel, or an aerosol.

BRIEF DESCRIPTION OF THE DRAWINGS

A complete understanding of the embodiments and the advantages and features thereof will be more readily understood by reference to the following detailed description when considered in conjunction with the accompanying drawings wherein.

DETAILED DESCRIPTION

Figure 1:
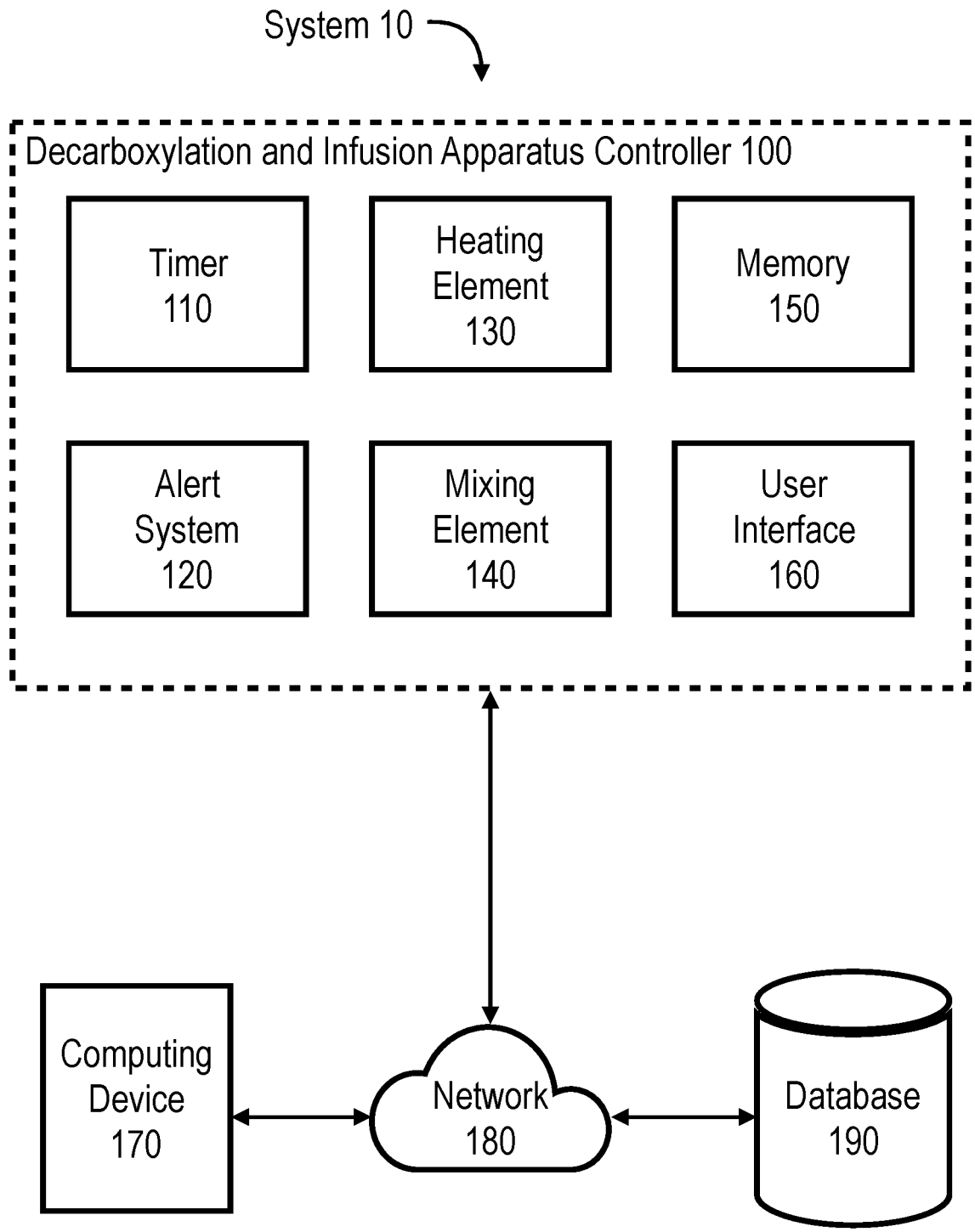
FIG. 1 illustrates a block diagram of the decarboxylation and infusion apparatus components, according to some embodiments.

The specific details of the single embodiment or variety of embodiments described herein are set forth in this application. Any specific details of the embodiments are used for demonstration purposes only, and no unnecessary limitation or inferences are to be understood therefrom. It is noted that the embodiments reside primarily in combinations of components related to the system and method of use thereof.

The present embodiments are based in part upon extraction procedures and delivery approaches that allow selective utilization of various cannabinoid molecules and terpenes from the cannabis plant. These various cannabinoid compounds are designed to selectively affect various cannabinoid receptors in the nervous system, immune system, and other tissues. The extract is an oil-based or solvent-based plant product that contains inactive and active compounds contained in the cannabis plant such as cannabinoids, terpenes, and/or flavonoids. Compositions of the invention and methods of extraction disclosed herein provide an extract with specific physiological properties that are mediated through separate pathways and receptors, which provide numerous benefits and advantages.

The extracts and/or delivery methods of the embodiments allow a wide range of prevention, treatment, and management options for patients. In some aspects, the delivery methods of the invention allow for employing micro-dosing with a stacking method of cannabinoid administration week-by-week until a certain saturation point, which is based on the response, weight, and monthly-quarterly test results. One skilled in the arts will readily understand the variety of product configurations and delivery mechanisms that may be produced using the embodiments.

It has been found that the age of the cannabis plant material in addition to the temperature in which it is stored and processed is critical. Importantly, for an extract to produce psychoactive properties or other significant properties found as a result of the consumption of decarboxylated molecules, the cannabis plant material is heated above 160° F.

Further the embodiments provided herein relate to a decarboxylation and infusion apparatus to produce an infused solvent. The apparatus decarboxylates organic material such as cannabis to activate molecules contained in the plant material. In one example, the apparatus is used to decarboxylate Cannabidiolic acid (CBDA) and Tetrahydrocannabinolic acid (THCA) into Cannabidiol (CBD) and Tetrahydrocannabinol (THC). One skilled in the arts will appreciate that various molecules contained in cannabis will readily undergo similar decarboxylation.

To facilitate decarboxylation, the apparatus is comprised of a heating element that can be selectively programmed to heat a reservoir containing the organic material to a specific temperature or temperature range. The heating element is further utilized to facilitate the infusion of the decarboxylated molecules into a solvent. It is known that infusion of molecules, including CDB and/or THC, is accomplished in a solvent such as cooking oils, glycerin, butter, or alcohol.

In some embodiments, the apparatus is in operable communication with a computing device that allows the user to control the function and operational settings of the apparatus during use. A mobile app may be downloaded to the computing device having a processor configured to perform instructions stored in a database. The database can include operational settings such as decarboxylation and infusions times, temperatures, pressures, agitation cycles, and protocols.

In some embodiments, the database may include a list of decarboxylation and infusion protocols for various recipes. Each recipe may be specific to one or more molecules, one or more organic materials, one or more solvents, and combinations thereof. Selecting a recipe may cause the apparatus to autonomously execute the instructions thereof.

In reference to FIG. 1, the system 10 for decarboxylating and infusing organic materials includes a decarboxylation and infusion apparatus controller 100 configured to produce a usable infused product which may be ingested or otherwise delivered to the user. The apparatus controller 100 may operate without the use of auxiliary tools or appliances. The apparatus controller 100 is in operable communication with a timer 110, alert system 120, heating element 130, and mixing element 140, which are programmable to carry out procedures for decarboxylating and infusing organic materials. The heating element 130 provides heat to a reservoir wherein the organic material is decarboxylated and infused. The mixing element 140 is provided within the reservoir to agitate the organic material and promote uniform heating during decarboxylation and infusion protocols. A memory 150 stores operational settings for the apparatus controller 100 for various organic materials and infused solvent products that can be created. Each operational setting is selectable using a user interface 160 provided on the apparatus 100 or a computing device 170 in communication with the user. Network 180 transmits and receives data to and from the computing device 170 and database 190 to the apparatus controller 100.

In some embodiments, the alert system 120 emits an alert corresponding to the operational status of the apparatus during use. For example, the alert system 120 may be in operable communication with a speaker(s) and/or light(s) corresponding to an operation status (e.g., when the heating process is done, when the cooling process is done, when decarboxylation is complete, when infusion is complete, etc.).

In some embodiments, instructions for operational settings are stored in the database, which can include hardware components or cloud-based data storage. The computing device displays selectable options to the user, which are transmitted via the network to operate the apparatus.

In some embodiments, the alert system alerts the user using the apparatus and/or the computing device upon completion of the decarboxylation and infusion protocols. Alerts can include any audio or visual means known in the arts.

Figure 2:
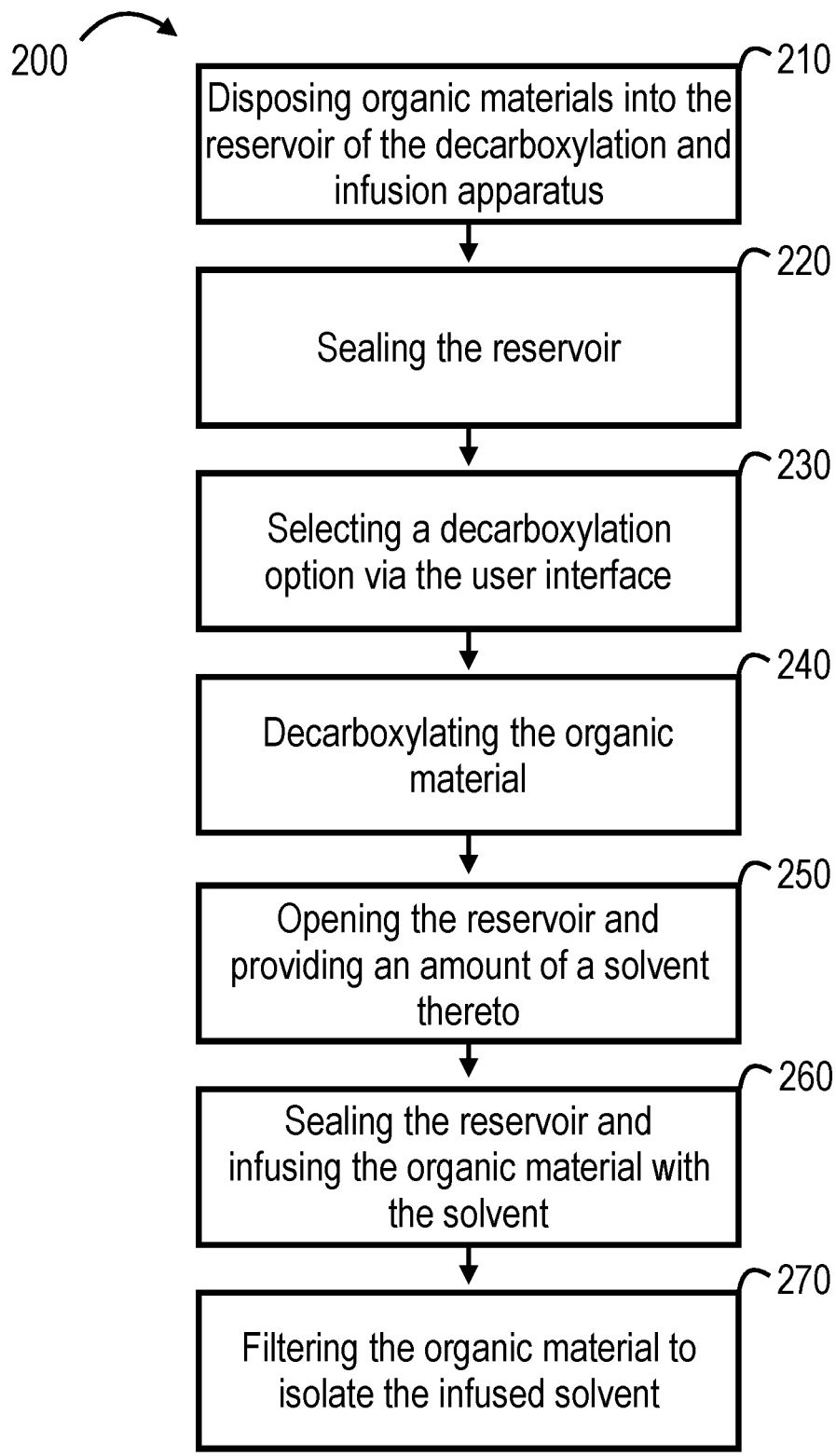
FIG. 2 illustrates a flowchart of a method for decarboxylating and infusing an organic material with a solvent using the decarboxylation and infusion apparatus, according to some embodiments.

FIG. 2 illustrates a method of use 200 of the apparatus. In step 210, the user disposed of organic materials into the reservoir of the decarboxylation and infusion apparatus 100. In step 220, the reservoir is sealed, and the user selects a suitable decarboxylation protocol using a user interface in step 230. The decarboxylation protocol may be altered depending on the organic material used and molecule to be decarboxylated. Following the decarboxylation protocol in step 240, the reservoir is opened, and a solvent is provided in step 250. In step 260, the reservoir is sealed, and the organic material is infused with the solvent to produce an infused solvent product. In step 270, the organic material is filtered to isolate the infused solvent, which can then be added to a foodstuff, beverage, topical, or another delivery mechanism.

In some embodiments, the user may select for isolation of one or more molecules by selecting an infusion pressure, an infusion temperature, one or more solvents, and infusion time. For example, the user can select to infuse CBD into the solvent without THC to reduce the psychoactive effects of the infused solvent.

Figure 3:
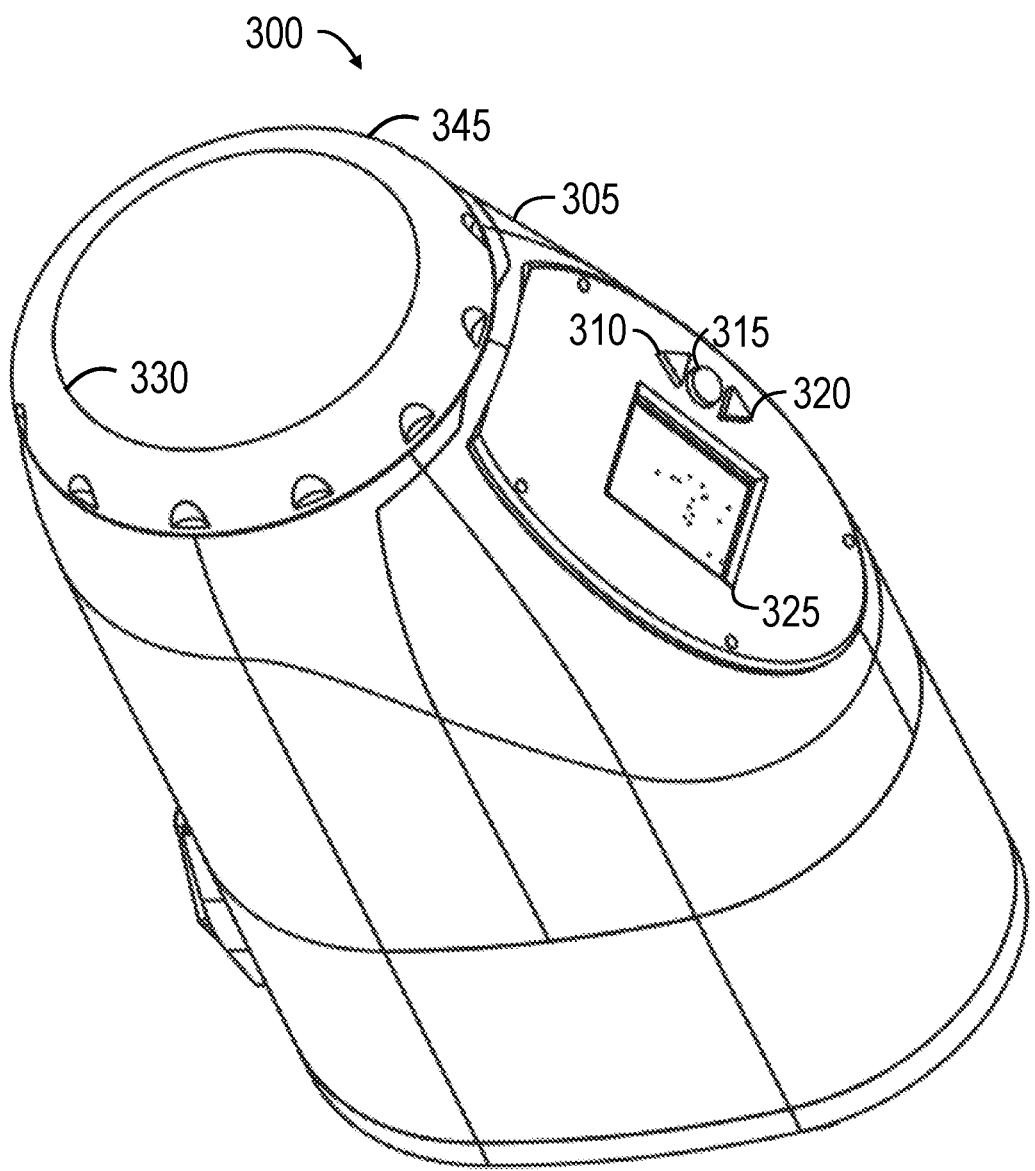
FIG. 3 illustrates a perspective view of the decarboxylation and infusion apparatus, according to some embodiments.
Figure 4:
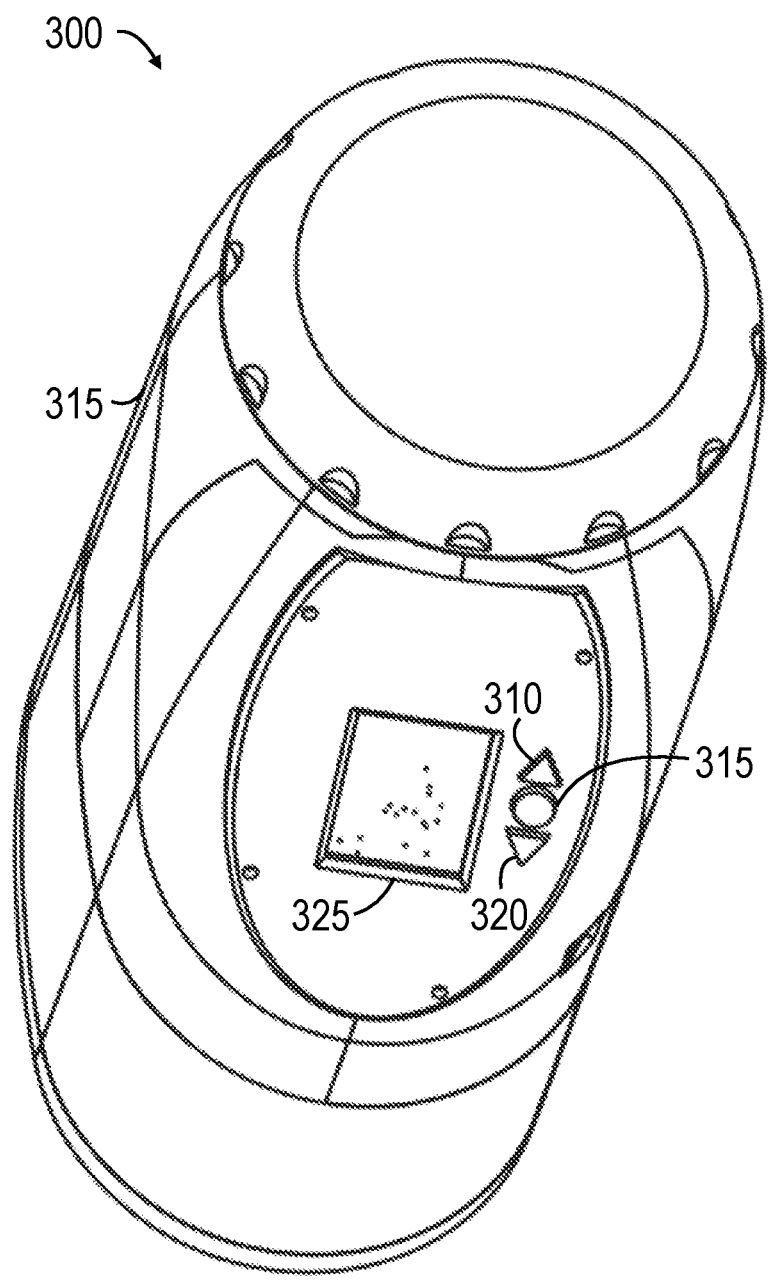
FIG. 4 illustrates a perspective view of the decarboxylation and infusion apparatus, according to some embodiments.

FIG. 3 and FIG. 4 illustrate the decarboxylation and infusion apparatus 300 comprising a housing 305 having controls 310, 315, 320 (collectively referred to as "controls"), and interface 325. Each of the controls permits the user to interact with the interface 325 to select various functionalities and operational parameters of the decarboxylation and infusion apparatus 300 to effectively decarboxylate and/or infuse or otherwise prepare the organic material.

In some embodiments, the interface 325 is configured as a touchscreen interface which provides the user the ability to control the various functionalities of the apparatus. For example, the user may select various heat settings, cooling settings, and/or timing settings. Further, the memory may include various pre-programmed settings for various types of organic material, various amounts of each type of organic material, or intended final product which are decarboxylated and infused by the apparatus.

In further reference to FIG. 3, a lid 330 is provided at the top portion 345 of the apparatus 300. The lid 330 may include a safety system which includes a sensor which determines if the lid 330 is in an open or closed position. When the lid 330 is in a closed configuration, the apparatus may perform the various tasks of decarboxylating the organic material. For example, when the lid 330 is in a closed configuration, the apparatus may perform the various functions necessary to decarboxylate organic material, to blend organic material, and/or to infuse the organic material.

In some embodiments, the sensor, when sensing an open position, may instruct the processor prevent specific functions of the apparatus once the lid 330 is in the open position. For example, if the lid 330 is open, the apparatus may be unable to blend the organic material, heat the organic material, or otherwise decarboxylate and infuse the organic material. In such, the sensor provides a safety mechanism to prevent injury or other unexpected and unintended results.

In some embodiments, the interface 325 is in operable communication with a speaker to provide audio feedback to the user. The speaker may emit alerts to the user once various processes are starting, in progress, and/or completed. For example, the speaker may emit a sound once the decarboxylation and/or infusion processes are completed.

Figure 5:
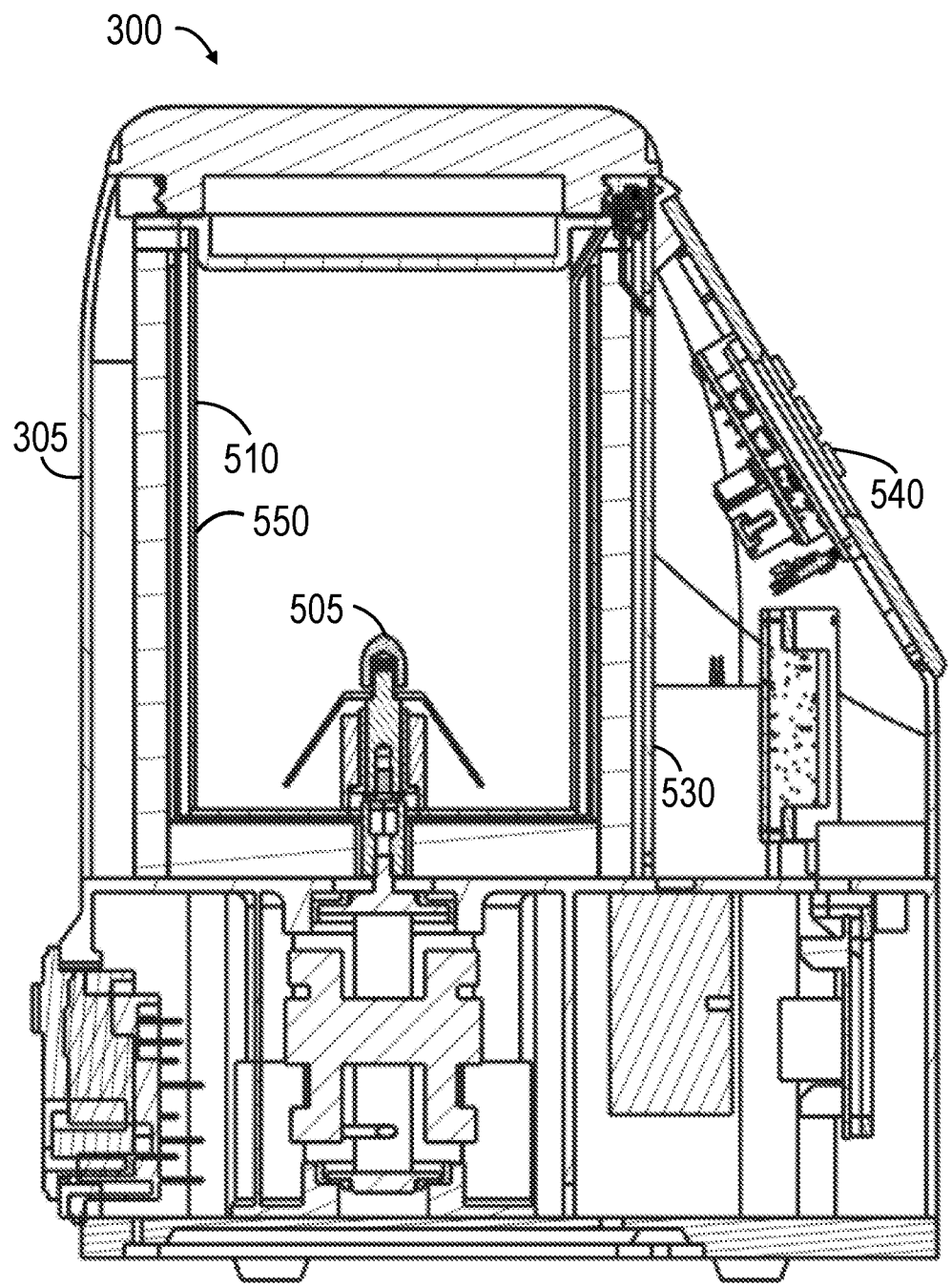
FIG. 5 illustrates a cross-section view of the internal components of the decarboxylation and infusion apparatus.

FIG. 5 illustrates a cross-section view of the decarboxylation and infusion apparatus 300 to show the housing 305 and the internal components thereof. A mixing element 505 is provided within a heated reservoir 510 to agitate organic material and a solvent disposed of therein. One skilled in the arts will readily understand that the organic material and solvent may change depending on the application of the product. A fan 530 is positioned within the housing 305 to aid in heat dissipation following the decarboxylation and infusion processes. The heat dispersion may aid in maintaining the quality by preventing degradation of the final product. Further, the fan 530 may aid in the removal and/or the redirection of odors produced throughout the process. The fan 530 is in communication with a vent 540 to permit the egress of air.

In some embodiments, the fan 530 is in operable communication with the controller 100 to provide operational controls to the fan 530 during cooling and deodorization. In such, the user may select a fan speed, deodorization settings, fan timing, and other controls to suitably cool the mixing chamber and deodorize air emitted from the vent 540.

In some embodiments, the vent 540 may include a filter such as carbon (charcoal) filtration, or similar filtration means to remove odors from the expelled air. The vent 540 may include one or more air expulsion elements, including auxiliary fans, to direct air from the mixing chamber through the vent 540 wherein the odor is neutralized, removed, or masked to prevent the odors within the mixing chamber from being emitted into the surrounding environment.

In some embodiments, the auxiliary fans allow expel heat via the vents 540 which allow the contents within the chamber to rapidly cool. This increases the quality of the final product by providing an apparatus which has precise and efficient heating and cooling systems.

In some embodiments, the heated reservoir is at least partially surrounded or encapsulated by an insulative layer 550 to thermally isolate the heated reservoir and the product therein within the apparatus from the environment and its ambient heating conditions as well as to evenly distribute the heat. An airtight lid may be provided to prevent oxygen from entering mixing chamber during the decarboxylation and infusion processes, minimize evaporation, and reduce odors.

In some embodiments, the insulative layer 550 prevents the material from being in contact with direct heat from the heating element. In such, the insulative layer 550 protects the material from degradation due to excessive heat.

In some embodiments, the heated reservoir 510 includes a spout to facilitate pouring of the product created from the decarboxylation and infusion process. The spout may also prevent counterrotation during blending. The spout may be configured as a complimentary shape to the housing the apparatus to prevent counterrotation and to ensure the heated reservoir 510 is properly positioned during the blending, decarboxylation and infusion processes.

The housing may be constructed of a variety of materials which are suitable, including, but not limited to, plastic, glass, silicone, food-grade butyl rubber, latex, aliphatic polyesters, natural rubber, metal, metal foils, polytetrafluoroethylene, biopolymers such as liquid wood, modified casein, polyhydroxyalkanoate polyesters, including polyhydroxybutrate, polyhydroxyvalerate, polylactic acid, starch-based polyesters, keratin processed with methyl acrylate, hemp polymers, hemp plastic, hemp composite polymers, and combinations thereof.

In some embodiments, the decarboxylation and infusion apparatus described herein provides a means for a semi-automated system for performing the chemical processes of decarboxylating an organic material and infusing the decarboxylated organic material into a solvent for various applications, including consumption by a human. The apparatus may be provided as a single contained unit within a housing to prevent contamination, or undue transfer of the raw or processes materials.

The housing may be provided in various configurations to provide a single containerized heated reservoir and mixing chamber and mixing element to decarboxylate an organic material and infuse the organic material with a solvent. The infused solvent may then be extracted from the housing and packaged or otherwise processed into a final product.

The preferable heat-cooking steps may comprise only one dry heat cooking step, multiple dry heat-cooking steps, and/or dry heat-cooking step(s) with blended herbs, chemicals, and flavorings.

Figure 6:
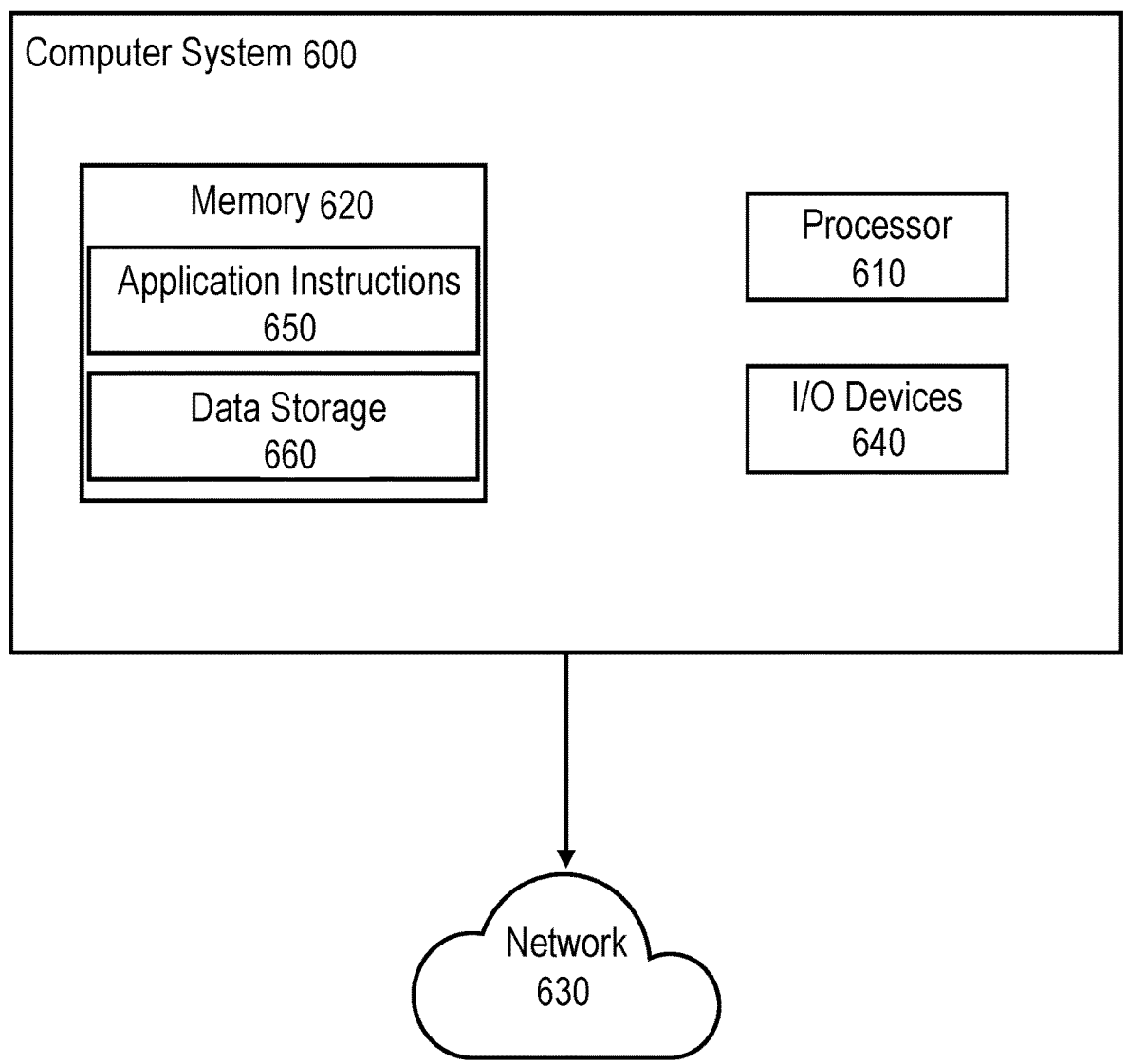
FIG. 6 illustrates a block diagram of the network infrastructure, according to some embodiments.

FIG. 6 illustrates a block diagram of the network infrastructure which may be used to control the decarboxylation and infusion apparatus which may be controlled via the touchscreen interface, and/or a mobile device, computer, and the like. The computer system 600, which may be utilized to execute the processes described herein. The computer system 600 is comprised of a standalone computer or mobile computing device, a mainframe computer system, a workstation, a network computer, a desktop computer, a laptop, or the like. The computer system 600 includes one or more processors 610 coupled to a memory 620 via an input/output (I/O) interface. Computer system 600 may further include a network interface to communicate with the network 630. One or more input/output (I/O) devices 640, such as video device(s) (e.g., a camera), audio device(s), and display(s) are in operable communication with the computer system 600. In some embodiments, similar I/O devices 640 may be separate from computer system 600 and may interact with one or more nodes of the computer system 600 through a wired or wireless connection, such as over a network interface.

Processors 610 suitable for the execution of a computer program include both general and special purpose microprocessors and any one or more processors of any digital computing device. The processor 610 will receive instructions and data from a read-only memory or a random-access memory or both. The essential elements of a computing device are a processor for performing actions in accordance with instructions and one or more memory devices for storing instructions and data. Generally, a computing device will also include, or be operatively coupled to receive data from or transfer data to, or both, one or more mass storage devices for storing data, e.g., magnetic, magneto-optical disks, or optical disks; however, a computing device need not have such devices. Moreover, a computing device can be embedded in another device, e.g., a mobile telephone, a personal digital assistant (PDA), a mobile audio or video player, a game console, a Global Positioning System (GPS) receiver, or a portable storage device (e.g., a universal serial bus (USB) flash drive).

A network interface may be configured to allow data to be exchanged between the computer system 600 and other devices attached to a network 630, such as other computer systems, or between nodes of the computer system 600. In various embodiments, the network interface may support communication via wired or wireless general data networks, such as any suitable type of Ethernet network, for example, via telecommunications/telephony networks such as analog voice networks or digital fiber communications networks, via storage area networks such as Fiber Channel SANs, or via any other suitable type of network and/or protocol.

The memory 620 may include application instructions 650, configured to implement certain embodiments described herein, and a database 660, comprising various data accessible by the application instructions 650. In one embodiment, the application instructions 650 may include software elements corresponding to one or more of the various embodiments described herein. For example, application instructions 150 may be implemented in various embodiments using any desired programming language, scripting language, or combination of programming languages and/or scripting languages (e.g., C, C++, C#, JAVA®, JAVASCRIPT®, PERL®, etc.).

The steps and actions of the computer system 600 described in connection with the embodiments disclosed herein may be embodied directly in hardware, in a software module executed by a processor, or in a combination of the two. A software module may reside in RAM, flash memory, ROM memory, EPROM memory, EEPROM memory, registers, a hard disk, a removable disk, a CD-ROM, or any other form of storage medium known in the art. An exemplary storage medium may be coupled to the processor 610 such that the processor 610 can read information from, and write information to, the storage medium. In the alternative, the storage medium may be integrated into the processor 610. Further, in some embodiments, the processor 610 and the storage medium may reside in an Application Specific Integrated Circuit (ASIC). In the alternative, the processor and the storage medium may reside as discrete components in a computing device. Additionally, in some embodiments, the events or actions of a method or algorithm may reside as one or any combination or set of codes and instructions on a machine-readable medium or computer-readable medium, which may be incorporated into a computer program product.

Also, any connection may be associated with a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. "Disk" and "disc," as used herein, include compact disc (CD), laser disc, optical disc, digital versatile disc (DVD), floppy disk and Blu-ray disc where disks usually reproduce data magnetically, while discs usually reproduce data optically with lasers. Combinations of the above should also be included within the scope of computer-readable media.

In some embodiments, the system is world-wide-web (www) based, and the network server is a web server delivering HTML, XML, etc., web pages to the computing devices. In other embodiments, a client-server architecture may be implemented, in which a network server executes enterprise and custom software, exchanging data with custom client applications running on the computing device.

Figure 7:
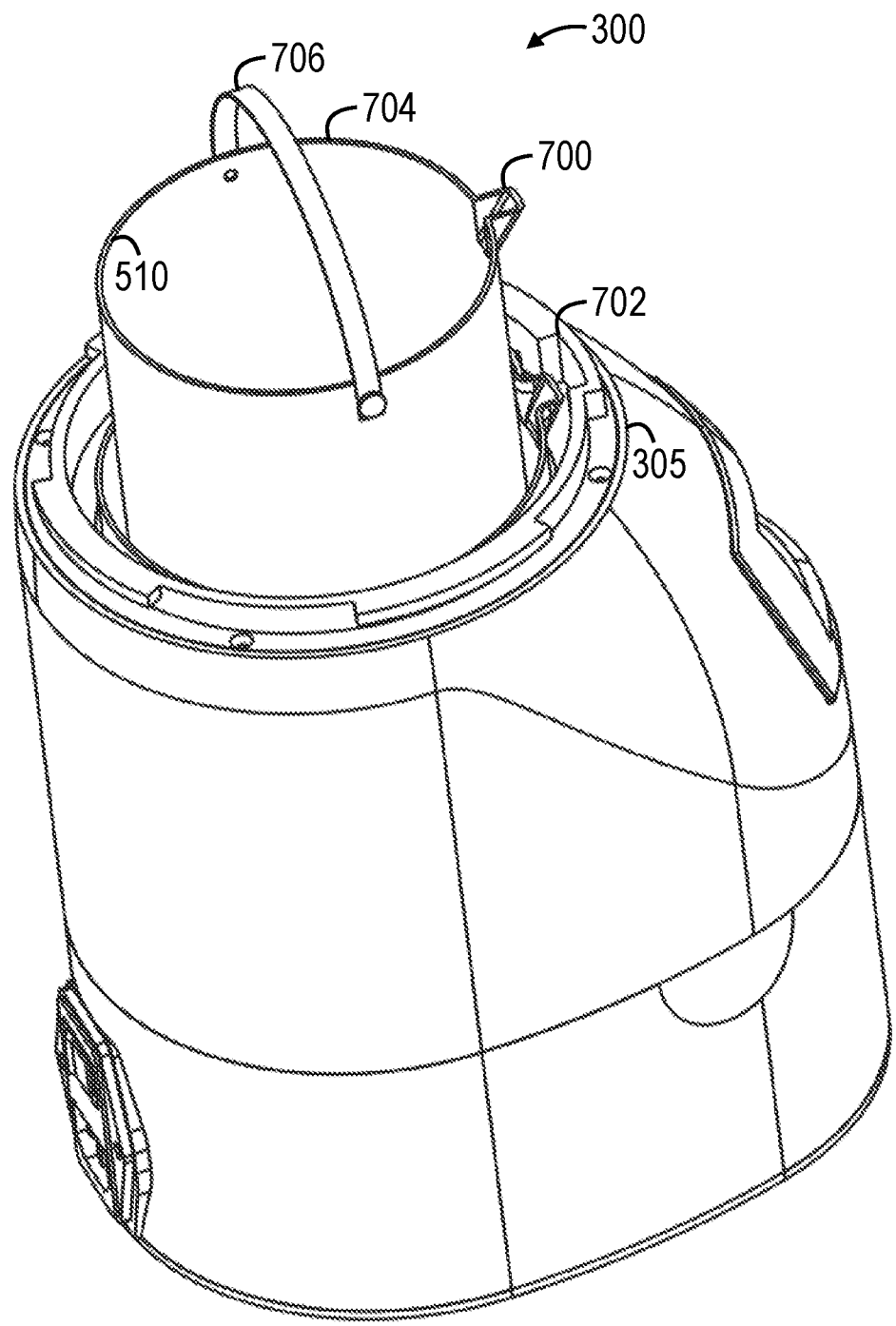
FIG. 7 illustrates a perspective view of the decarboxylation and infusion apparatus, according to some embodiments.
Figure 8:
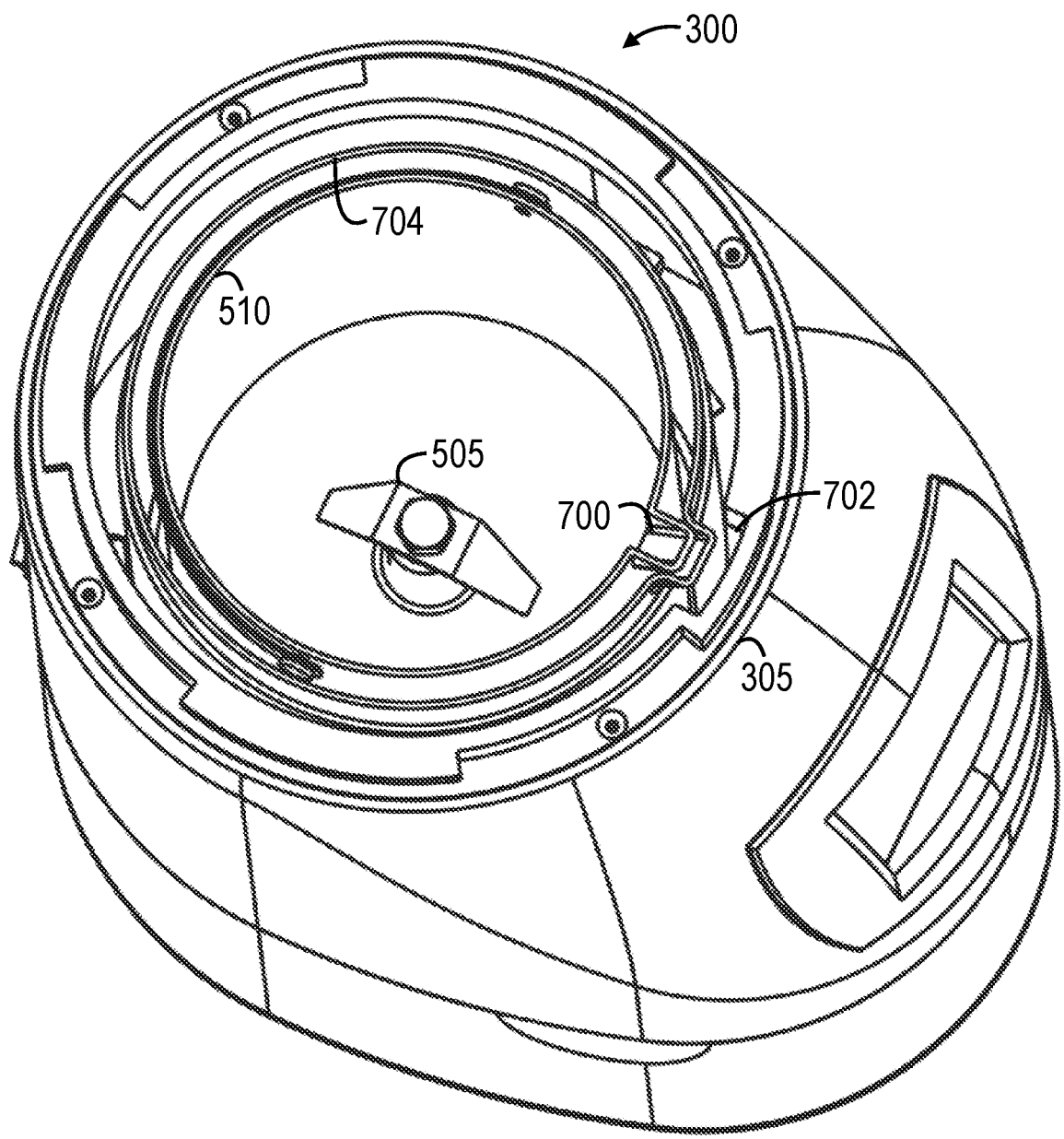
FIG. 8 illustrates a perspective view of the decarboxylation and infusion apparatus, according to some embodiments.

FIG. 7 and FIG. 8 illustrate a perspective view of the decarboxylation and infusion apparatus 300 wherein the heated reservoir 510 is removable from the apparatus. The heated reservoir 510 includes a spout 700 which fittingly engages with a complimentary portion 702 molded into the housing 305 to prevent counterrotation during blending of the organic material. The spout 700 is positioned at the perimeter 704 of the heated reservoir 510. The handle 706 may be provided on the heated reservoir 510 to facilitate the removal of the heated reservoir 510 from the housing 305. In specific reference to FIG. 8, the mixing element 505 is shown. During operation, the mixing element 505 may emit a force onto the heated reservoir 510 causing a counterrotation. This counterrotation is stopped by the spout 700 fittingly engaging with the complimentary portion 702 of the housing 305.

Figure 9:
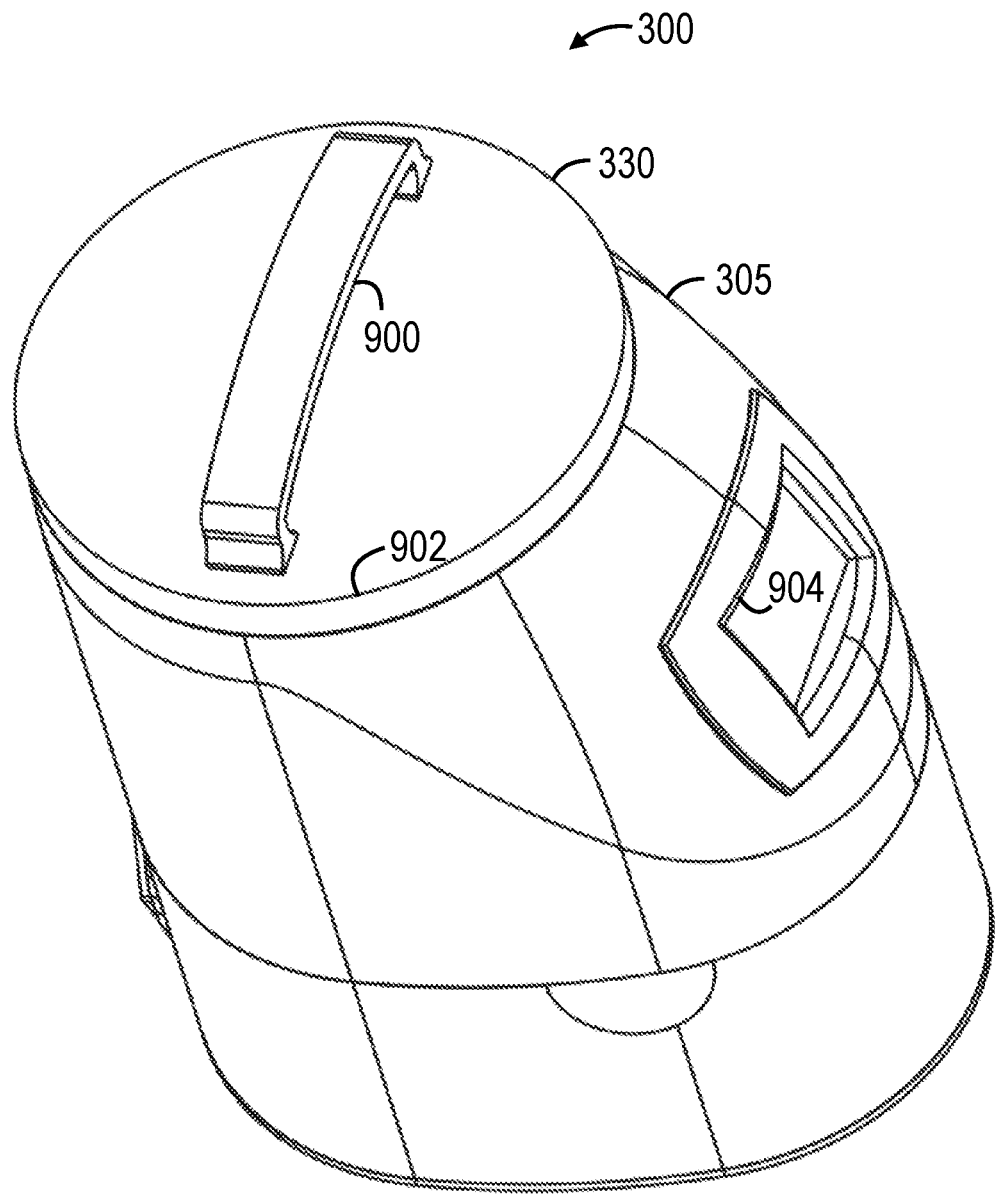
FIG. 9 illustrates a perspective view of the decarboxylation and infusion apparatus, according to some embodiments.

FIG. 9 illustrates a perspective view of the decarboxylation and infusion apparatus 300 having an airtight lid 330 which is engaged to the housing 305. A handle 900 is positioned on a top surface 902 of the lid 330 which allows the user to easily pick up and carry the apparatus 300 as well as facilitates the removal of the lid 330. This lid 330 may include a locking mechanism which is activated to ensure the lid 330 is not opened during the mixing, decarboxylation, and/or infusion processes.

In some embodiments, the apparatus may utilize a touchscreen interface 904 rather than buttons (as shown in FIGS. 3-5 310, 315, 320) to allow the user to select operation settings.

Many different embodiments have been disclosed herein, in connection with the above description. It will be understood that it would be unduly repetitious and obfuscating to literally describe every combination and subcombination of these embodiments. Accordingly, all embodiments can be combined in any way and/or combination, and the present specification, shall be construed to constitute a complete written description of all combinations and subcombinations of the embodiments described herein, and of the manner and process of making and using them, and shall support claims to any such combination or subcombination.

It will be appreciated by persons skilled in the art that the present embodiment is not limited to what has been particularly described hereinabove. A variety of modifications and variations are possible in light of the above teachings without departing from the following claims.

What is claimed is:

1. A system for decarboxylating and infusing an organic material, the system comprising:
   a decarboxylation and infusion apparatus including a heated reservoir including a spout to fittingly engage with a complimentary portion of a housing, the decarboxylation and infusion apparatus in operable communication with a user interface whereon a user selects decarboxylation and infusion settings, the heated reservoir including a mixing element to agitate an organic material and solvent disposed therein, the spout to prevent counterrotation caused by the mixing element; and
   a fan to actively cool the heated reservoir, the fan in communication with a vent having a filter, the vent to expel and deodorize air emitted therefrom.

2. The system of claim 1, wherein the user interface is provided on a smart device in wireless communication with the decarboxylation and infusion apparatus.

3. The system of claim 1, wherein the user interface is provided on a top portion of the decarboxylation and infusion apparatus, and wherein the user interface is a touchscreen.

4. The system of claim 1, wherein the heated reservoir comprises an insulated layer.

5. The system of claim 4, wherein the insulated layer prevents direct heat from being applied to the organic material.

6. The system of claim 1, wherein the user interface includes a speaker to permit audio notification to be transmitted.

7. The system of claim 1, wherein the decarboxylation and infusion apparatus is in operable communication with a computing device operating an application program, the application program operation the user interface to operate the decarboxylation and infusion apparatus.

8. A system for decarboxylating and infusing an organic material, the system comprising:
   a decarboxylation and infusion apparatus including a heated reservoir including a spout positioned at a perimeter of the heated reservoir, the spout to fittingly engage with a complimentary portion of a housing, the decarboxylation and infusion apparatus in operable communication with a user interface whereon a user selects decarboxylation and infusion settings, the heated reservoir including a mixing element to agitate an organic material and solvent disposed therein, the spout to prevent counterrotation caused by the mixing element;
   a handle positioned on the heated reservoir to facilitate the removal of the heated reservoir from the housing; and
   a fan to actively cool the heated reservoir, the fan in communication with a vent having a filter, the vent to expel and deodorize air emitted therefrom.

9. The system of claim 8, including an alert system to alert the user of an operational status.

10. The system of claim 9, wherein the user interface is provided on a smart device in wireless communication with the decarboxylation and infusion apparatus.

11. The system of claim 10, wherein the user interface is provided on a top portion of the decarboxylation and infusion apparatus, and wherein the user interface is a touchscreen.

12. The system of claim 11, wherein the heated reservoir comprises an insulated layer.

13. The system of claim 12, wherein the insulated layer prevents direct heat from being applied to the organic material.

14. The system of claim 13, wherein the user interface includes a speaker to permit audio notification to be transmitted.

15. The system of claim 14, wherein the decarboxylation and infusion apparatus is in operable communication with a computing device operating an application program, the application program operation the user interface to operate the decarboxylation and infusion apparatus.

* * * * *